United States Patent [19]

Beecher, II et al.

[11] Patent Number: 5,430,473
[45] Date of Patent: Jul. 4, 1995

[54] CAMERA FIELD-OF-VIEW INDICATOR

[75] Inventors: Robert L. Beecher, II; Michael R. Groesch, both of Fishers; Daniel M. Iaria; Ellen A. Keen, both of Indianapolis, all of Ind.

[73] Assignee: AT&T Corp., Murray Hill, N.J.

[21] Appl. No.: 323,429

[22] Filed: Oct. 14, 1994

Related U.S. Application Data

[63] Continuation of Ser. No. 817,042, Jan. 3, 1992, abandoned.

[51] Int. Cl.$^6$ .............................................. H04N 7/14
[52] U.S. Cl. ..................................... 348/14; 348/13; 348/20
[58] Field of Search ........................... 348/13, 14, 20; 354/219, 106; H04N 7/14

[56] References Cited

U.S. PATENT DOCUMENTS

| | | | |
|---|---|---|---|
| D. 321,870 | 11/1991 | Beecher, II et al. | D14/130 |
| 2,909,600 | 10/1959 | Becker | 358/85 |
| 3,116,365 | 12/1963 | Prescott | 358/85 |
| 3,419,674 | 10/1965 | Burns et al. | 178/6.8 |
| 3,495,908 | 2/1970 | Rea | 358/85 |
| 3,532,815 | 10/1970 | Torok | 358/85 |
| 4,159,170 | 6/1979 | Kuramoto et al. | 354/295 |
| 4,490,029 | 12/1984 | Tanaka et al. | 354/106 |

FOREIGN PATENT DOCUMENTS

| | | | |
|---|---|---|---|
| 1909419 | 8/1970 | Denmark | H04N 7/14 |
| 2529352 | 12/1983 | France | G03B 13/00 |

Primary Examiner—Curtis Kuntz
Assistant Examiner—Jason Chan
Attorney, Agent, or Firm—Michael A. Morra

[57] ABSTRACT

A two-way video telephone station includes a television screen for displaying an image transmitted by a distant party to a telephone conversation, a video camera for electronically photographing a human subject and periodically transmitting his picture to the distant party, and position-indicating apparatus for keeping the subject within the camera's field of view. The position-indicating apparatus includes a pair of light-emitting diodes (LEDs)—one on each side of the camera. The LEDs are visible to the subject when he is out, or almost out, of the camera's field of view. Because the LEDs can only be seen when the subject needs to take corrective action, they act as passive restraints that are completely unnoticed when the subject is properly positioned. Red LEDs are used to indicate that movement should stop if the subject wishes to be centered in the picture transmitted to the distant party. In an alternate embodiment of the invention, a third LED is added which is green in color and is only visible to the subject when he is within the camera's field of view. Advantageously, the subject sees yellow light when he is at the edge of the camera's field of view.

5 Claims, 3 Drawing Sheets

CAMERA FIELD-OF-VIEW INDICATOR

This application is a continuation of application Ser. No. 07/817,042, filed on Jan. 3, 1992, now abandoned.

TECHNICAL FIELD

This invention relates to camera equipment, and more particularly to apparatus for keeping the target (human subject) of the camera within its effective operating region.

BACKGROUND OF THE INVENTION

Camera equipment typically does not require more that the skill of its operator to keep the camera aimed at its subject. However when the operator is also the subject, he has no way of knowing whether the camera is properly aimed. Developers of early video telephone systems, such as AT&T's Picturephone service, realized that this was a major problem needing solution because the whole purpose behind Picturephone service was to allow each party to see the other during a telephone conversation. The Picturephone product comprised a video camera mounted above a miniature display screen (television) in a single housing. Each party to this service could see the other on the screen while being the subject of the video camera. During the conversation, the parties would need to tell each other that they needed to move a little to the left or right so that they could be seen.

One solution that has been proposed is the use of a light emitting indication member which can be observed from any position within the range of the scene to be photographed. This solution is discussed in U.S. Pat. No. 4,490,029 in connection with camera photography when the photographer wants to become part of the picture. Continual reminders of the presence of the equipment is a distraction that calls too much attention to the limitations of the equipment. Human factors considerations in the design of such equipment suggests that it should be transparent to the parties and obvious to use. With this in mind, the facts remain that the camera is stationary, and human subjects are prone to move.

A solution that was used in Picturephone service was a "self view" feature wherein the subject would depress a button to see, on the display screen, how he looked to the distant party. In particular, he could determine whether he was in the center of the picture or off to one side. While this particular technique is generally useful, it requires the subject to be actively concerned with the operation of the equipment which, as discussed above, is undesirable.

Another solution is to use a "split screen" in which a portion of the screen is devoted to self view where the subject continually observes his appearance, Apart from narcissism, encouraged by this practice, it is a distraction that diverts the subject's attention from the message toward the media, and takes up too much space on the already small display screen.

Still another solution is to arrange for the camera to automatically track its subject. This would allow the subject to move around naturally to different positions without ever worrying whether he will be seen by the distant party. An example of such a system is disclosed in U.S. Pat. No. 3,419,674 which was issued to R. V. Burns et al. on Dec. 31, 1968. Burns teaches an apparatus for automatically positioning a movably mounted television camera in response to the movement of a subject. Video signals, indicating transitions between the subject and the background, are used together with horizontal and vertical sync pulses to generate a control signal for a motor that moves the television camera. Unfortunately, automatic tracking is costly to implement and may not be needed in most applications.

SUMMARY OF THE INVENTION

In accordance with the invention, a position-indicating device is located on a camera which is only visible to a subject of the camera when he is outside the camera's field of view.

In the illustrative embodiment of the invention, a two-way video telephone station includes a television screen for seeing a distant party to a telephone conversation and a video camera for electronically photographing the subject and periodically transmitting his picture to the distant party. The position-indicating device comprises a pair of light emitting diodes (LEDs), one on each side of the camera, that are only visible when the subject is out of the camera's field of view. This is the preferred embodiment because the LEDs can only be seen when the subject needs to take corrective action. They act as passive restraints on the subject's movement and are completely unnoticed when he is properly positioned. Red LEDs are used to indicate that movement should stop if the subject wishes to remain centered in the picture transmitted to the distant party.

In an alternate embodiment of the invention, three LEDs are used to provide the subject with different color indications in accordance with his location with respect to the camera's field of view. In this embodiment, a green LED is used to indicate that the subject is within the camera's field of view and red LED's are used to indicate that he is outside the field of view. These LEDs combine to provide a yellow indication that the subject is at the edge of the field of view.

BRIEF DESCRIPTION OF THE DRAWING

The invention and its mode of operation will be more clearly understood from the following detailed description when read with the appended drawing in which.

DETAILED DESCRIPTION

Figure 1:
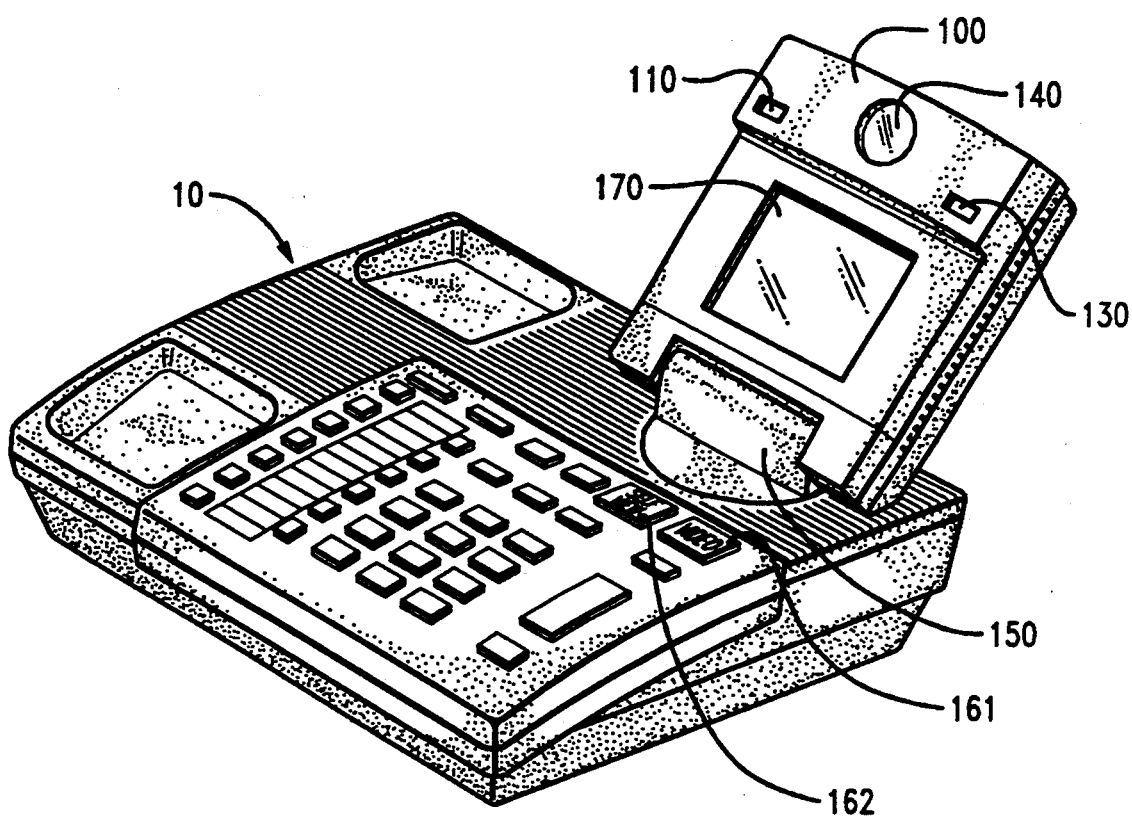
FIG. 1 discloses a video telephone station in accordance with the present invention.

FIG. 1 discloses a video telephone station 10 which is intend for use over the public switched telephone network similar to a conventional telephone set. Telephone station 10 includes all of the equipment needed for making regular telephone calls using a handset (not shown) or a built-in microphone and loudspeaker for hands-free (speakerphone) conversations. In addition to such equipment, apparatus is provided that allows a human subject to see the distant party to the conversation and be seen by him. (Although masculine pronouns "he" and "him" are used for the sake of convenience to denote the subject of the camera, they are understood to include both male, female and other subjects that have the capacity to respond to light.) Accordingly, video unit 100 includes a camera behind opening 140 for obtaining an electronic image of the subject and transmitting it over the network to the distant party. Video unit 100 further includes a video screen 170 for displaying the image of the distant party. Naturally, the distant party will need to have compatible video telephone equipment. A swivel mount 150 is provided to support video unit 100 in a plurality of positions so that the telephone station 10 can remain in a stationary position while the video unit is turned to accommodate the subject. Indeed, the swivel mount 150 rotates about two axes that are perpendicular to each other. One of the axes allows the unit 100 to be tilted back and forth so that subjects of different height can face the screen directly. Because the screen 170 and the camera opening 140 have a fixed position relative to each other, when the subject directly faces the screen he is also directly facing the camera. The other axis allows the unit 100 to be rotated to the left and right so that the subject need not sit directly in front of the telephone station 10 each time he makes a video telephone call.

Included on the top surface of the telephone station 10 are buttons for controlling its operation. After an audio telephone connection is established using the standard telephone circuitry within station 10, video operation is commenced by pressing "video" button 161. The party the presses the "video" button not only initiates high speed (19.2 kBs), full duplex data communication, but also enables the camera to transmit his image to the other party. In order to protect privacy, the other party to the conversation would also need to press their "video" button 161 before their image was transmitted.

During normal operation, subjects do not move up and down very much (e.g., if they are seated, they typically stay seated for the duration of the call). However, subjects do tend to move to the left and right quite a bit; and even though they can still see the display screen 170 acceptably, they frequently move to the edge of the camera's range or even out of it entirely. In order to determine whether the subject is properly within the camera's field of view, a "self view" button 162 is also included on the top surface of the telephone station 10. Pressing the "self view" button causes the image captured by the camera behind opening 140 (and transmitted to the distant party) to be displayed on screen 170. In this manner, the subject can determine how he looks to the distant party and whether he is centered on the screen. Indeed, the subject may even choose to establish a video telephone call, but spend the entire time looking at himself—in which case the present invention would be of diminished importance. Pressing the "self view" button again causes the image of the distant party to be displayed. Assuming, however, that the subject wishes to see the distant party while remaining centered in the image transmitted to the distant party, one or more position indicators are provided for this purpose.

In the preferred embodiment of the invention, shown in FIG. 1, red lights are located within video unit 100 behind openings 110, 130 that are only visible to the subject when he has moved too far to the left or right of center. The color red is chosen because it is conventionally associated with the condition that something is wrong or that movement should be stopped. It operates as a passive restraint in that the subject can ignore its message if he does not wish to be in the center of the transmitted image. Because the indicators cannot be seen during normal video communication (when the subject is within the camera's field of view), its operation is completely unnoticed and does not call attention to the limitations of a stationary camera.

Figure 2:
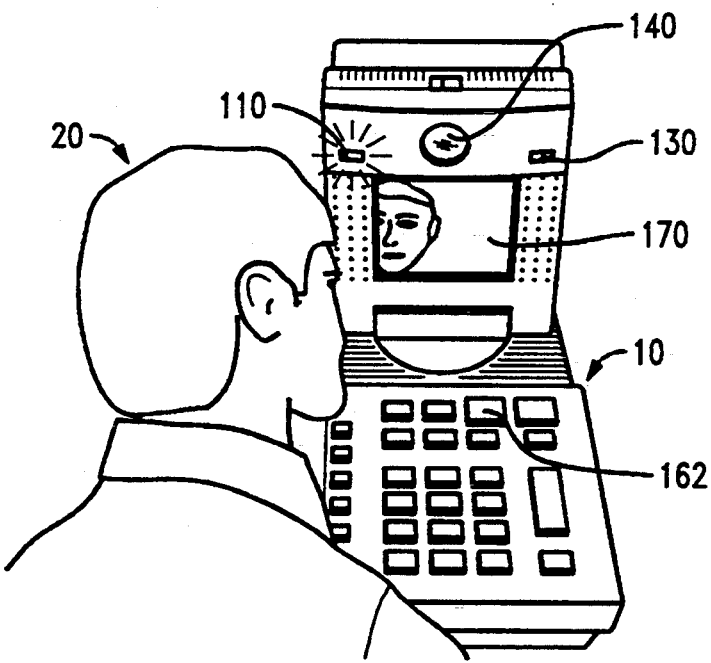
FIG. 2 shows the video telephone station of FIG. 1 during "self-view" operation when the subject is positioned off center.

The operation of the indicators will be better appreciated when reference is made to FIG. 2 which illustrates their operation in connection with the "self view" mode. As discussed above, when the subject presses button 162, he is able to view his own image on display screen 170—the same one that is transmitted to the distant party. As shown in FIG. 2, subject 20 is positioned to the left of the camera a condition that can either be discerned by the subject when he looks at display 170 during "self view," or by noticing the red light behind opening 110. When the subject is in this position, he sees light passing through opening 110, but not through opening 130. If he is positioned too far to the right of camera opening 140, then the situation is reversed and he sees light passing through opening 130 but not through opening 110. These lights are always on during video transmission and provide a reliable indication to the subject. Once the subject see the red light, he can move back toward the center of the camera's field of view. Eventually the subject becomes conditioned to its operation and his response is automatic. When red light stimulates the peripheral vision of his right eye, the subject moves slightly to the left; and when it stimulates his left eye, he moves to the right. It is the designer's choice as to how much side-to-side movement will be permitted before the position indicators become visible.

Figure 3:
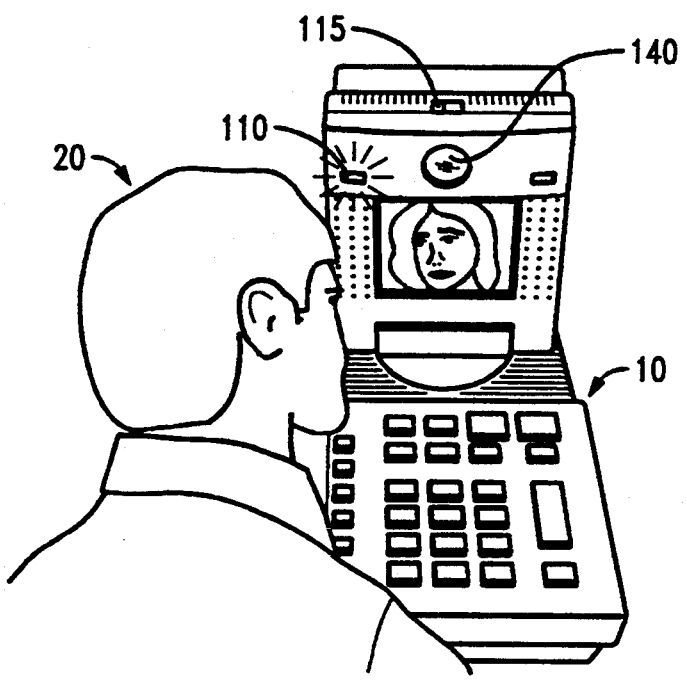
FIG. 3 shows the video telephone station of FIG. 1 during normal video operation when the subject is positioned off center.

In FIG. 3 the subject 20 is shown engaging in a video telephone conversation with the distant party; but, as in FIG. 2, he is positioned too far to the left. The distant party is centered on the display screen, so the subject may think everything is normal. Further, since the telephone station 10 is not in the "self view" mode at this time, the subject cannot see the image of himself that is transmitted to the distant party. Fortunately, the subject is alerted to the fact that he is too far to the left by the position indicator comprising a light behind opening 110. If the subject 20 does not wish to be seen, rather than moving out of the camera's field of view, he can push slide switch 115 from left to right (as viewed by the subject) and cause a mechanical shutter to cover opening 140 where the video camera is located.

Figure 4:
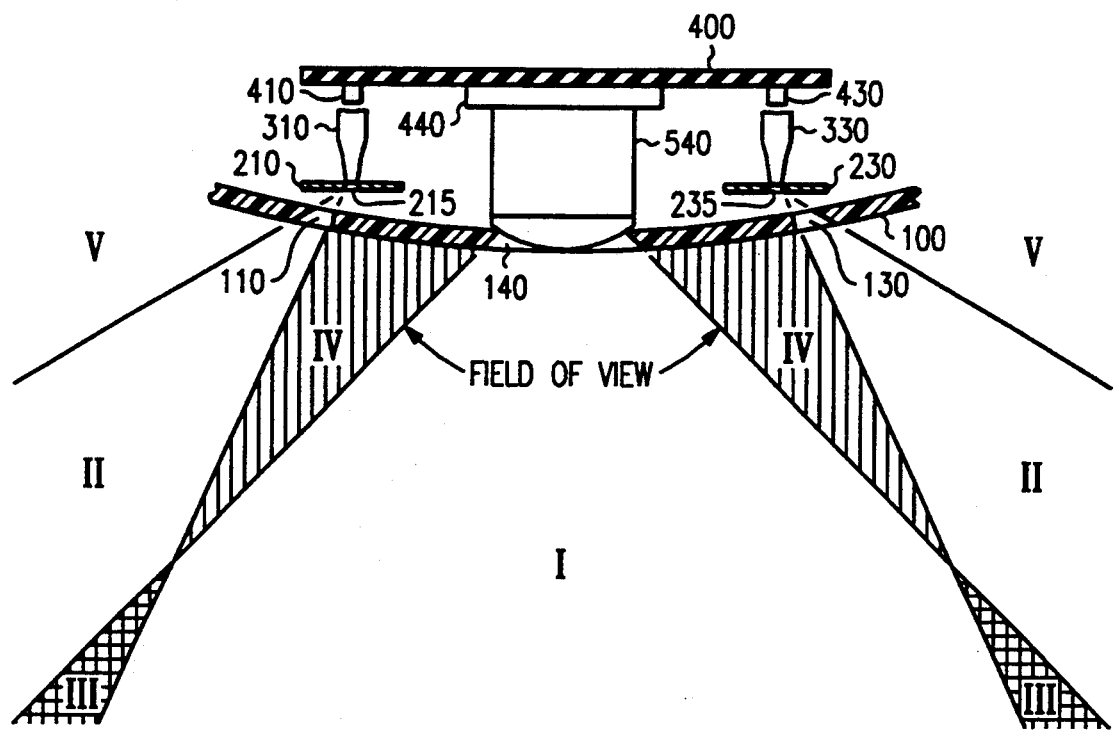
FIG. 4 discloses a top, cross section view of a first embodiment of the invention which uses a pair of LEDs to indicate to the subject that he is located outside the camera's field of view.

FIG. 4 discloses a top, cross section view of video unit 100 that houses the camera and the position indicators. Within the video unit 100, circuitry for operating the camera and display is mounted on circuit board 400. Video camera 440 is a charge coupled device such as the CCB-C35T which is commercially available from Sony Corp. It is mounted on circuit board 400 and converts visual images that enter lens assembly 540 through opening 140 into electrical signals for transmission to the distant party to a video telephone conversation. Also mounted on circuit board 400 are light emitting diodes (LEDs) 410, 430 that provide a source of illumination for the position-indicating function. An acceptable component is the 1261 surface-mounted LED which emits red light and is commercially available from the Panasonic Corp. Light guides 310, 330 are molded from either acrylic, polycarbonate, or clear ABS (Acrylonitrile Butadiene Styrene) material. Light guides 310, 330 are designed to guide the maximum amount of light from the LEDs to the openings 110, 130. The front portion of each light guide comprises a non smooth surface for dispersing light in all directions. This type of surface is achieved by sand blasting the corresponding surface of the tool used to mold the light guide. Since all light that enters the light guide from the LED is not confined to the light guide, shields 210, 230 are used to block light from sources other than the light-dispersing surfaces of the light guides from entering openings 110, 130. These shields comprise 1/16 inch, neoprene gaskets. Light emanating from the light-dispersing surface of each light guide passes through openings 215,235 in the light shields and then through openings 110, 130 in the video unit 100.

FIG. 4 also defines, using Roman numerals, various regions where the subject may be positioned in front of the video unit 100. Region I is the location where the camera can see the subject, but where the LEDs cannot be seen by the subject. Note that in the preferred embodiment, it is not desirable for the subject to see the LEDs when everything is ok—much like the "oil" light on an automobile. Regions IV and V are the locations where the camera cannot see the subject, and the subject cannot see the LEDs. It is doubtful that the subject could actually fit into Region IV, but it is shown for the sake of completeness. Region II is the location where the subject cannot be seen by the camera, but the subject can see the LED to alert him of this condition. Finally, Region III is possibly the most useful region of all because it is where the subject is still within the camera's field of view, but is able to see the LED which alerts him that he is beginning to move out of it. As can be appreciated, the geometry of these regions is a matter of design choice that is conveniently controlled by the relative placement of lens assembly 540, position-indicating assembly 210, 310, 410; position-indicating assembly 230, 330, 430; and the size/placement of openings 110, 130, 140.

Although FIG. 4 discloses the use of two openings 110, 130 and two LEDs 410, 430 to create a region (Region I) where light cannot be seen when the subject is in the camera's field of view, it is clearly possible to achieve functionally equivalent results using slightly different layouts. For example, a single opening in video unit 100 could be used (preferably located in the same vertical plane as opening 140) with light sources positioned behind the single opening on either side. Alternatively, a single light source (preferably located in the same vertical plane as opening 140) could be used in conjunction with a pair of side by side openings in unit 100. Finally, a light guide (shaped like a 2-pronged fork) could by used to guide light from a single LED to its light-dispersing end surfaces positioned on either side of a single opening in unit 100 (preferably located in the same vertical plane as opening 140).

Figure 5:
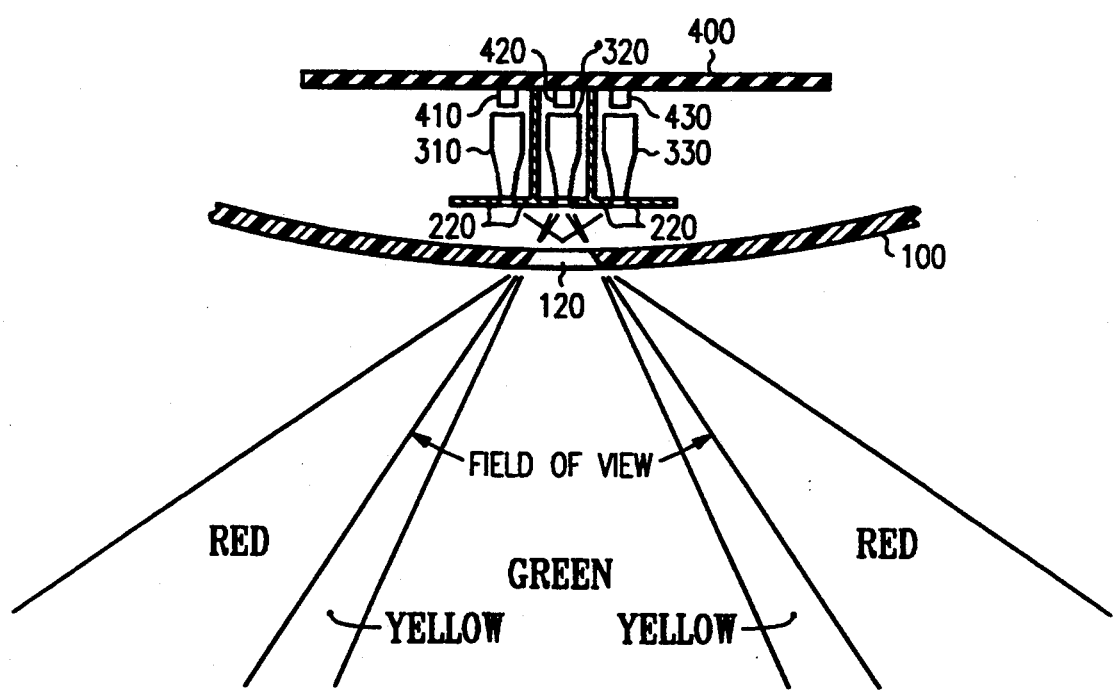
FIG. 5 discloses a top, cross section view of a second embodiment of the invention which uses one green LED to indicate to the subject that he is located within the camera's field of view, and a pair of red LEDs to indicate that he is outside the field of view.

An alternate embodiment of the invention is shown in FIG. 5 which a number of persons find desirable. Indeed, it is very useful for some persons to be continuously reminded of their positioning relative to the camera's field of view. Accordingly, the position-indicating apparatus of FIG. 5 comprises a green LED 420 that is only visible to the subject when he is fully within the camera's field of view, and a pair red LEDs 410, 430 that are only visible to the subject when he is outside the camera's field of view. These LEDs are mounted on circuit board 400; and light guides 310, 320, 330 are used to bring their light toward the front surface of video unit 100 where it can be seen through opening 120. Additively combining red and green light creates yellow light which is advantageously used in the embodiment of FIG. 5 to keep the subject within the camera's field of view. Although other colors may be used, red and green are preferred because they correspond to the colors used in a traffic control device to deliver a similar message. (The opening for the camera assembly is mounted directly above or below opening 160, and provides a field of view that includes only the red and yellow regions.) A subject residing in the center of the camera's field of view only sees a green light. As he moves to the left or right of center, the color changes to yellow and then to red as he moves out of the field of view. The relative position of opening 120, with respect to the light-dispersing surfaces of light guides 310, 320, 330, controls what the subject sees from different locations. The design disclosed in FIG. 5 purposely overlaps the red and green regions to create yellow, although such overlap is not required. Additionally, there is no need for the red and green lights to share the same opening 120. Light shield 220 precludes light rays within video unit 100, other than those emanating from the light-dispersing surfaces of the light guides, from passing through opening 120.

Although various particular embodiments have been shown and described, it is understood that modifications may be made within the spirit and scope of the invention. These modifications include, but are not limited to, the use of a light-reflecting surface rather than a light in the position-indicating apparatus of the invention, relocation of the camera lens assembly and position-indicating apparatus to create a different geometry of Regions, the use of different colors to alert the subject regarding his positioning, and the use of the present invention to control movement in a plane other than the horizontal plane or in equipment other than a video camera.

We claim:

1. Position-indicating apparatus for use with a camera having a limited field-of-view in a horizontal plane having left-side and right-side boundaries, said apparatus functioning to alert a human subject of his physical location relative to the camera's field-of-view, the apparatus comprising first and second light-emitting sources, none of which are visible to the subject when he is within the camera's field-of-view but one of which is visible when he is outside said field-of-view, the first and second light-emitting sources having one color; the apparatus further comprising a third light-emitting source which is visible to the subject when he is within the camera's field-of-view but invisible when he is outside said field-of-view, the third light-emitting source having another color; whereby the human subject is continuously alerted as to his position relative to the camera's field-of-view.

2. The position-indicating apparatus of claim 1 wherein the first and second light-emitting sources comprise red light-emitting diodes.

3. The position-indicating apparatus of claim 1 wherein the third light-emitting source comprises a green light-emitting diode.

4. Position-indicating apparatus for use with a camera having a limited field-of-view in a horizontal plane and functioning to alert a human subject of his relative position with respect to the field-of-view, the field-of-view comprising left-side and right-side boundaries and transition regions adjacent to said boundaries, the apparatus comprising first and second light-emitting sources having one color which is visible outside the camera's field-of-view and within said transition regions; the apparatus further comprising a third light-emitting source which is visible to the subject when he is within the camera's field-of-view but invisible when he is outside said field-of-view, the third light-emitting source having another color.

5. The position-indicating apparatus of claim 4 wherein the first and second light-emitting sources emit red light and wherein the third light-emitting source emits green light; whereby the subject sees a green light when he is fully within the camera's field of view, yellow light within the transition regions, and red light otherwise.

* * * * *